United States Patent
Gautier et al.

(10) Patent No.: US 6,957,793 B2
(45) Date of Patent: Oct. 25, 2005

(54) CONTACT SUPPORT FOR A CYCLE SAFETY DEVICE

(76) Inventors: Gérard Gautier, 19 Villa de la Réunion, Paris (FR); Yves Michel Jeulin, 8 rue du Dessous des Berges, Paris (FR); Emmanuel Broquin Lacombe, 28 rue Edmond Nocard, Saint Maurice (FR)

( * ) Notice: Subject to any disclaimer, the term of this patent is extended or adjusted under 35 U.S.C. 154(b) by 0 days.

(21) Appl. No.: 09/979,362
(22) PCT Filed: Mar. 22, 2001
(86) PCT No.: PCT/FR01/00864
§ 371 (c)(1), (2), (4) Date: Apr. 30, 2002
(87) PCT Pub. No.: WO01/70561
PCT Pub. Date: Sep. 27, 2001

(65) Prior Publication Data
US 2002/0134893 A1 Sep. 26, 2002

(30) Foreign Application Priority Data
Mar. 23, 2000 (FR) .............................................. 00 03701

(51) Int. Cl.⁷ .................................................. F16L 3/00
(52) U.S. Cl. ........................................ 248/49; 340/479
(58) Field of Search ........................... 248/49; 340/432, 340/473, 541, 479; 200/61.12, 61.87; 188/65.2, 65.1, 67

(56) References Cited

U.S. PATENT DOCUMENTS

| | | | | |
|---|---|---|---|---|
| 3,900,084 A | * | 8/1975 | Farr | 188/196 F |
| 4,586,021 A | * | 4/1986 | Nickols | 340/134 |
| 4,896,138 A | | 1/1990 | Nickols | 340/479 |
| 5,803,207 A | * | 9/1998 | Nielsen | 188/24.12 |
| 6,454,055 B1 | * | 9/2002 | Coons et al. | 188/24.22 |

* cited by examiner

Primary Examiner—Gwendolyn Baxter
(74) Attorney, Agent, or Firm—Weingarten, Schurgin, Gagnebin & Lebovici LLP

(57) ABSTRACT

A contact support suitable for mounting on a cycle brake control cable, the support comprising: a first portion which is fixed relative to the cycle frame, said fixed portion having a first contact surface; a second portion which is movable relative to the cycle frame, and suitable for being secured to the cable, said moving portion presenting a second contact surface; the support comprising connection means between the fixed portion and the moving portion, said connection means being suitable for being deformed elastically between: an extreme relaxed state for the support in which the contact surfaces are spaced apart from each other; and a tensioned state for the support in which the contact surfaces press against each other, the connection means then being elastically deformed.

7 Claims, 2 Drawing Sheets

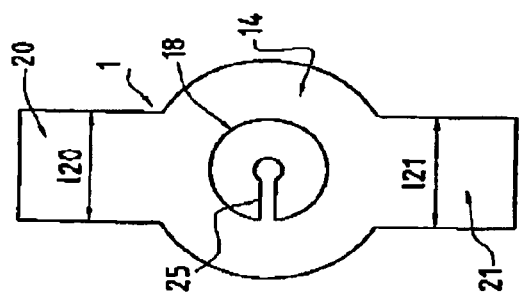
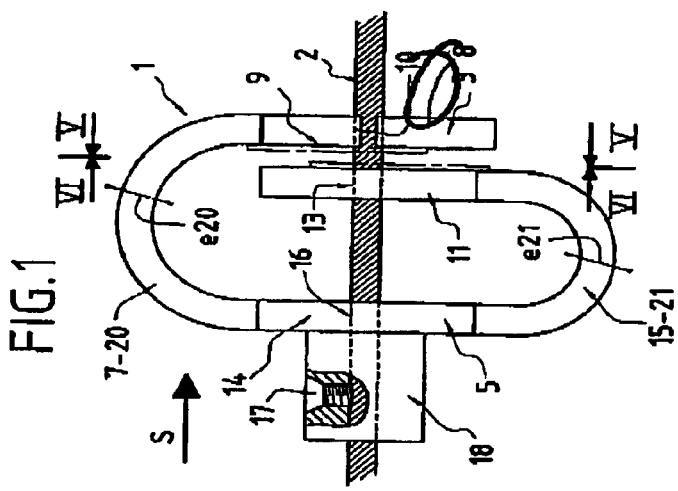
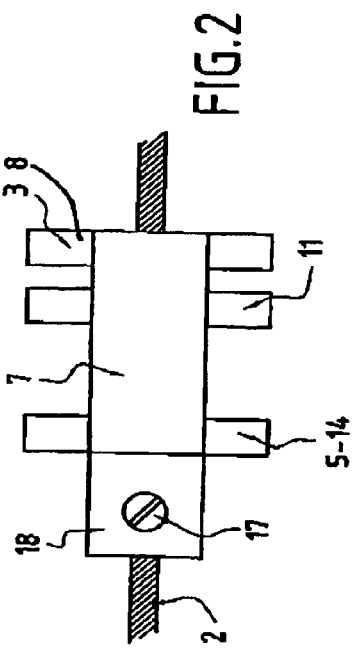
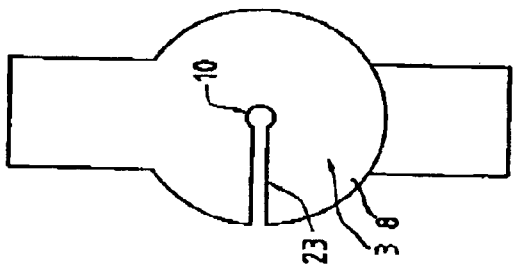

CONTACT SUPPORT FOR A CYCLE SAFETY DEVICE

FIELD OF THE INVENTION

The invention relates to the technical field of safety accessories for vehicles of the bicycle, cycle, bike, tandem, tricycle, mountain bikes, cross-country bike, or motorcycle type, and also to other equivalent wheeled vehicles.

For simplification purposes, such vehicles are referred to below under the short term "cycle" and their users as "cyclists".

BACKGROUND OF THE INVENTION

The invention relates more particularly to a safety accessory for use during braking under the control of the users of such vehicles.

The braking means of such vehicles comprise drum brakes, brakes controlled by back-pedalling, hydraulic or pneumatic brakes, and friction brakes engaging the wheel rims.

The invention relates more particularly to vehicles of the general type mentioned in the introduction, provided with braking systems that are controlled by cables.

This applies in particular to brakes that apply friction to rims. By way of example, such brakes can be of the caliper or V-brake type, where caliper brakes comprise jaws, sometimes also referred to as hinged levers or brackets, said jaws being provided with brake blocks having friction linings, and the jaw is caused to clamp onto the wheel rim under the control of a cable. The cable is conventionally moved by working a lever mounted on the vehicle handlebar, the control cable connecting said lever to the brake jaws. When the lever is actuated, the control cable is pulled under tension in its guide tube and causes the brake jaws to close, thereby giving rise to friction between the brake linings and the wheel rim. Return springs or any other equivalent resilient means serve to return the jaw to an open position when the control lever is released. Cable traction can be applied centrally or laterally. Conventionally, each wheel is provided with a brake jaw connected by a respective control cable to a lever mounted on the handlebar.

For safety reasons, it is most important for cyclists to be visible to other road users, particularly in the dark, and in particular when cyclists apply the brakes, insofar as such braking often precedes a change in direction.

Various systems are already known in the prior art for controlling braking signal lamps for cycles.

Reference can be made, for example, to the following documents: FR-A-2 756 803, FR-A-2 708 557, FR-A-2 652 052, DE-A-19 633 018, DE-A-19 654 628, DE-A-19 808 774, U.S. Pat. No. 5,526,240, U.S. Pat. No. 5,457,612, U.S. Pat. No. 4,899,023, U.S. Pat. No. 4,275,280, U.S. Pat. No. 4,031,343, U.S. Pat. No. 3,906,443, U.S. Pat. No. 3,870,846, GB-A-2 236 905, GB-A-2 229 052, GB-A-2 130 015, WO-A-91/12977.

Certain prior art devices propose placing contactors on the handlebar. Thus, for example, document EP-A-0 109 763 describes a bicycle brake light switch comprising electrical contacts contained in a deformable closed tube that is flattened under direct action from the brake lever. In that type of structure, detecting braking relies on the shape of the tube being appropriate relative to the shape and the stroke of the brake lever, and as a result that structure cannot be fitted as standard on all types of cycles. Furthermore, it is difficult to monitor the state of the electrical contacts contained in the closed tube without resorting to complete disassembly.

Other types of prior art device have contactors that are placed closer to the braking jaws. Thus, for example, document WO-A-86/00055 describes braking equipment for a bicycle in which a lamp is switched on by one of the brake jaws coming into contact with a terminal of the electrical circuit. That type of configuration turns out to be unreliable when cycles are used in muddy terrain.

The control systems known in the prior art turn out to be complex and expensive in structure. In addition, those systems are not as a general rule designed to be suitable for fitting on any type of existing cycle. The fragility of certain means known in the prior art for detecting brake cable movement also tends to make them unreliable, particularly when the cycle has been used on muddy surfaces.

OBJECTS AND SUMMARY OF THE INVENTION

The invention seeks to provide a braking safety device for cycles having cable-controlled brakes, said device comprising a contactor for a rear "stop" light that does not present the drawback of devices known in the prior art, the device being inexpensive, reliable, easy to maintain, quick to install, suitable for fitting to any conventional model of cycle without modifying the general structure of said cycle, and without requiring the device to be specially dimensioned as a function of the model of cycle having cable-controlled brakes.

To this end, in a first aspect, the invention provides a contact support suitable for mounting on a cycle brake control cable, the support comprising:

a first portion which is fixed relative to the cycle frame, said fixed portion having a first contact surface;

a second portion which is movable relative to the cycle frame, and suitable for being secured to the cable, said moving portion presenting a second contact surface;

the support comprising connection means between the fixed portion and the moving portion, said connection means being suitable for being deformed elastically between:

an extreme relaxed state for the support in which the contact surfaces are spaced apart from each other; and a tensioned state for the support in which the contact surfaces press against each other, the connection means then being elastically deformed.

To term "connection means suitable for being deformed elastically" is used herein to mean means configured in such a manner that they are not subjected to any significant plastic deformation when the support is in operation.

BRIEF DESCRIPTION OF THE DRAWINGS

Other objects and advantages of the invention appear from the following description of embodiments, which description is given with reference to the accompanying drawings, in which:

FIG. 1 is a side view of a contactor for a safety device of the invention, in position mounted on a cycle brake control cable, the cable being in its brake-release situation;

FIG. 2 is a plan view of the contactor shown in FIG. 1;

FIG. 3 is a view of the right-hand side of the contactor shown in FIG. 1;

FIG. 4 is a view of the left-hand side of the contactor shown in FIG. 1;

MORE DETAILED DESCRIPTION

Figure 7:
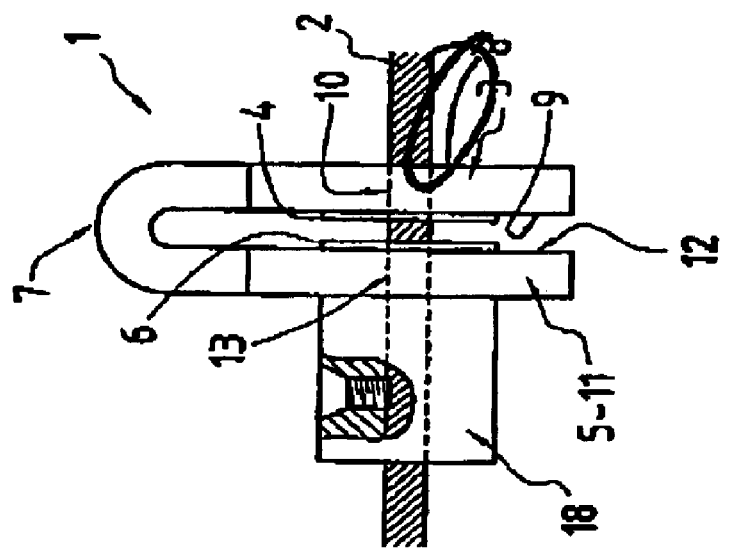
FIG. 7 is a side view of a contactor for a safety device, in a variant embodiment.

In FIGS. 3, 4, 5, and 6, the cable is omitted, for simplification purposes.

The device shown comprises a contact support 1, referred to below merely as a "support", mounted on a cycle brake control cable 2.

The cable 2 is of any conventional type. For example, the cable is constituted by twisted metal strands. Apart from a short length for receiving the support 1, the cable 2 is contained in a guide tube (not shown) of the type having a low coefficient of friction, for example having an internal duct of polytetrafluorethylene and an outer tube of polyacryle, polysulfone, or any other equivalent material.

The support 1 comprises:

a first portion 3 which is fixed relative to the cycle frame and which is rigidly mounted on the cycle frame (not shown), said fixed portion 3 presenting a first contact surface 4;

a second portion 5 which is movable relative to the cycle frame and which is secured to the cable 2, said moving portion 5 having a second contact surface 6; and connection means 7 between the fixed portion 3 and the moving portion 5, said connection means 7 being elastically deformable between:

a relaxed extreme state for the support 1, which state is shown in the figures and in which the contact surfaces 4 and 6 are spaced apart from each other; and a tensioned state for the support 1 (not shown) in which the contact surfaces 4 and 6 press against each other, the connection means 7 then being elastically deformed.

The fixed portion 3 comprises a plate 8 having a plane face 9 into which there opens out a through hole 10 extending substantially perpendicularly to the plane in which said face 9 extends. When the support 1 is in the mounted position, the cable 2 can slide without friction through the through hole 10, in particular when applying and releasing the brakes. The first contact surface 4 extends over the plane face 9.

The moving portion 5 comprises a plate 11 provided with a plane face 12 into which there opens out a through hole 13 that extends substantially perpendicularly to the plane in which said face 12 extends. The second contact surface 6 extends over the plane face 12.

In the embodiment shown in FIGS. 1 to 6, the moving portion 5 comprises, in addition to said plate 11, a rear plate 14, the plate 11 and the rear plate 14 being interconnected by a section 15 which is subjected to elastic deformation when the support 1 changes between a released state and a tensioned state. In this embodiment, when the support 1 is in the mounted position, the cable 2 can slide without friction through the through hole 13, in particular while the brakes are being applied or released.

In other embodiments, as shown diagrammatically in FIG. 7, the plate 11 is rigidly fixed to the cable 2, e.g. by screw fastening, adhesive, welding, or any other equivalent process, so the cable 2 cannot slide through the through hole 13.

As shown in FIGS. 1 to 6, the rear plate 14 is provided with a through hole 16 through which the cable 2 passes. When the support 1 is in the mounted position, the cable 2 cannot slide through the through hole 16, in particular while the brakes are being applied or released. For example, and as shown, a lock screw 17 is mounted on a threaded tab 18 secured to the rear plate 14 and it presses the cable 2 against an abutment when the support 1 is in the mounted position.

The two plane faces 9 and 12 respectively supporting the first and second contact surfaces face each other and are substantially parallel when the support 1 is in the released position. Starting from this released position, actuating the control cable 2 in the direction of arrow S in FIG. 2 (applying the brakes) caused the moving plate 11 to move towards the fixed plate 8 so that the contact surfaces 4 and 6 are pressed against each other.

Additional traction on the cable 2 causes the connection means 7 (embodiment of FIG. 7) and the section 15 (embodiment of FIGS. 1 to 6) to become deformed. Releasing the cable 2 allows the reverse movement to take place, with a return to the released state shown in FIG. 1.

In the configuration of FIGS. 1 to 6, the three plates 8, 11, and 14 are substantially identical and are in the form of disks pierced by through holes 10, 13, and 16 that are in alignment to pass the cable 2. These disks are interconnected by arcuate deformable strips of substantially constant radii of curvature in such a manner that, when seen laterally as in FIG. 1, the support 1 has a first deformable arch 20 connecting the front plate 8 to the rear plate 14, and a second deformable arch 21 connecting the rear plate 14 to the intermediate plate 11. The widths $l_{20}$, and $l_{21}$ of the arches 20 and 21 are substantially identical. The thicknesses $e_{20}$ and $e_{21}$ of the arches are substantially identical to the thicknesses of the plates 8, 11, and 14, in the embodiment shown.

Other configurations could be implemented. As shown in FIG. 7, the support need have only one deformable arch connecting a front plate 8 which is fixed to the cycle frame to a moving rear plate 11 which is secured to the cable 2. The shapes and the dimensions of the deformable connection means are selected by the person skilled in the art as a function of the stiffness desired for the support.

Figure 6:
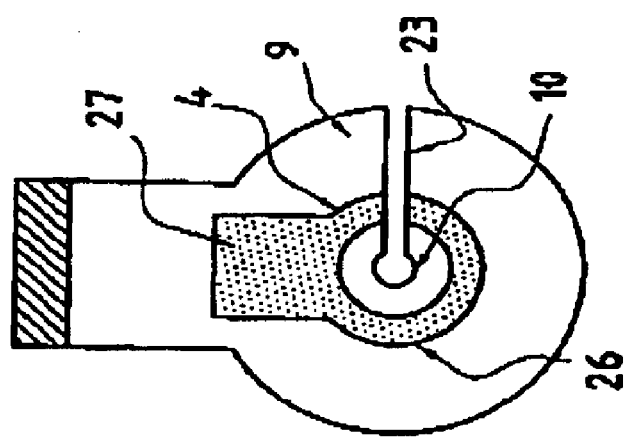
FIG. 6 is a view on plane VI—VI of FIG. 1.
Figure 5:
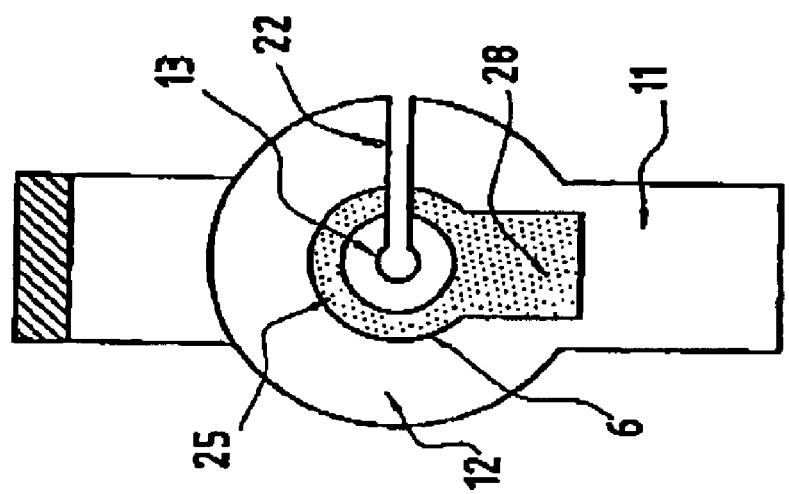
FIG. 5 is a view on plane V—V of FIG. 1.

The support can be put into place on the cable 2 quite simply, each plate being provided with a narrow radial slot 22, 23, 24 through which the cable 2 can be inserted by force in order to occupy the through holes 10, 13, 16. As shown in FIGS. 1, 5, and 6, the radial cable-insertion slots 22 and 23 extend in two opposite directions in the front plate 8 and in the intermediate plate 11. This disposition makes it possible to reduce the risk of losing the support 1, since the cable 2 is held in place by the transverse elasticity of the support 1 between the front plate 8 and the intermediate plate 11.

The contact surfaces 4 and 6 comprise respective annular zones 25 and 26 extending coaxially around the through holes 10 and 13, said annular zones 25 and 26 being connected to conductive strips 27 and 28 forming terminals of an electrical circuit (not shown) that includes a light bulb secured to the cycle frame.

By way of example, the light bulb can illuminate a reflecting surface coated in a fluorescent compound. The electric circuit can include a battery that can optionally be a rechargeable battery, or indeed it can be connected to a conventional dynamo.

The support 1 can be made of polymer material or of composite material. The support 1 can be a single piece, integrally molded or otherwise, or it can be a built-up assembly.

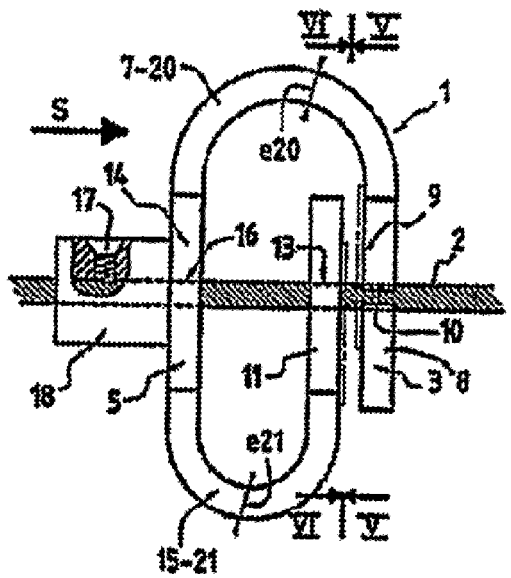

What is claimed is:

1. A contact support suitable for mounting on a cycle brake control cable, the support comprising:

a first portion which is fixed relative to a cycle frame, said first portion having a first contact surface;

a second portion which is movable relative to the cycle frame, and suitable for being secured to the cable, said second portion presenting a second contact surface;

wherein the support comprises connection means between the first portion and the second portion, said connection means being suitable for being deformed elastically between:

an extreme relaxed state for the support in which the contact surfaces are spaced apart from each other; and a tensioned state for the support in which the contact surfaces press against each other, the connection means then being elastically deformed;

wherein two plane faces respectively supporting the first and second contact surfaces face each other and are substantially parallel when the support is in the released position; and wherein the contact support comprises three substantially identical plates in the form of disks each pierced by a respective through hole, which holes are in alignment to pass the cable, said disks being interconnected by deformable strips in the form of arches.

2. A contact support according to claim 1, wherein the first portion comprises a plate provided with the plane face into which there opens out the respective through hole extending substantially perpendicularly to the plane in which said face extends, the first contact surface extending over the plane face, the second portion comprising an intermediate plate provided with the plane face into which there opens out the respective through hole extending substantially perpendicularly to the plane in which said face extends, the second contact face extending over the plane face.

3. A contact support according to claim 2, wherein the second portion further comprises, in addition to said plate, a rear plate, the plate and the rear plate being interconnected by a section comprising one of said deformable arches, said section being suitable for being deformed elastically when the support passes from the relaxed state to the tensioned state.

4. A contact support according to claim 2, wherein the rear plate is provided with the respective through hole for passing the cable, the support being provided with securing means for securing the rear plate to the cable.

5. A contact support according to claim 4, wherein the securing means comprise a lock screw mounted on a threaded tab secured to the rear plate and suitable for pressing the cable against an abutment.

6. A contact support according to claim 1, wherein radial slots for cable insertion extend in two opposite directions in the front plate and in the intermediate plate.

7. A contact support according to claim 6, wherein each contact surface comprises an annular zone, said annular zones being coaxial about the through holes, said annular zones being connected to conductive stripe forming terminals of an electrical circuit.

* * * * *

UNITED STATES PATENT AND TRADEMARK OFFICE
CERTIFICATE OF CORRECTION

| | | |
|---|---|---|
| PATENT NO. | : 6,957,793 B2 | Page 1 of 3 |
| APPLICATION NO. | : 09/979362 | |
| DATED | : October 25, 2006 | |
| INVENTOR(S) | : Gautier et al. | |

It is certified that error appears in the above-identified patent and that said Letters Patent is hereby corrected as shown below:

The title page showing the illustrative figure should be deleted and substitute with the attached title page.

Second page of drawings, Sheet 1 of 2, please replace the figures with the following new figures :

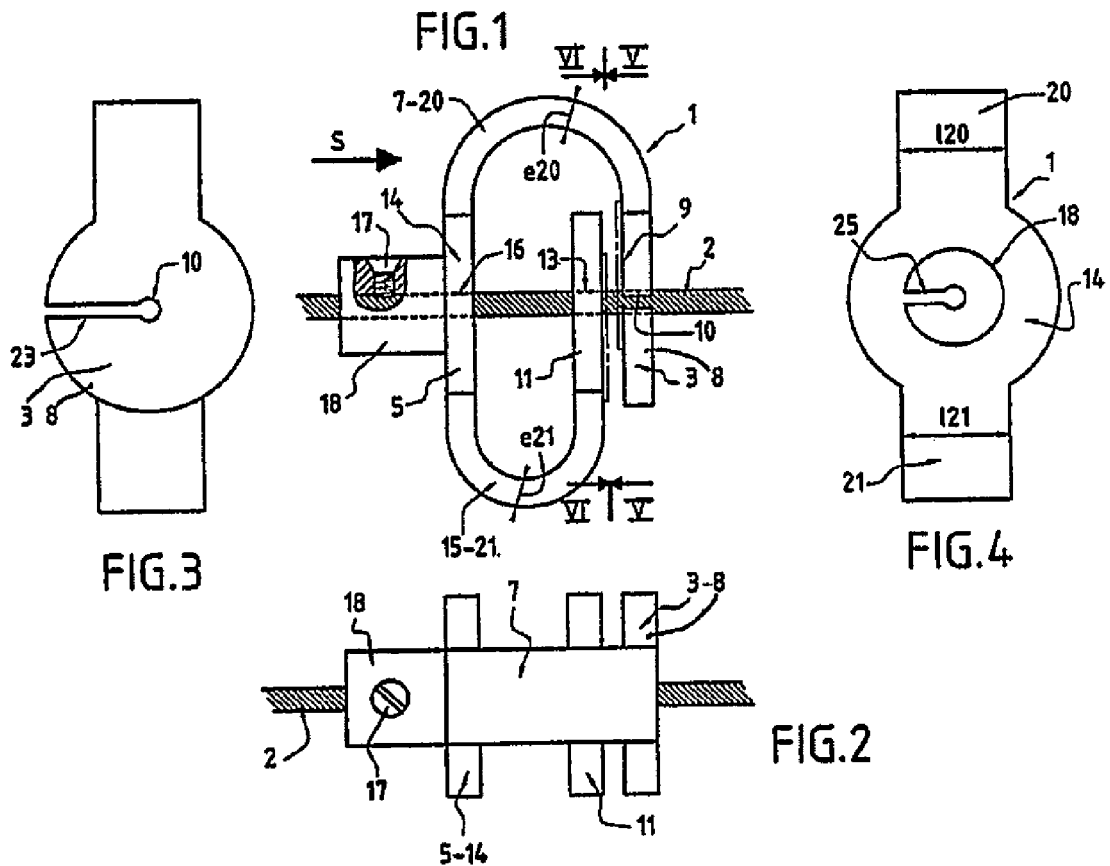

UNITED STATES PATENT AND TRADEMARK OFFICE
CERTIFICATE OF CORRECTION

PATENT NO.      : 6,957,793 B2
APPLICATION NO. : 09/979362
DATED           : October 25, 2006
INVENTOR(S)     : Gautier et al.

It is certified that error appears in the above-identified patent and that said Letters Patent is hereby corrected as shown below:

Third page of drawings, Sheet 2 of 2, please replace the figures with the following new figures:

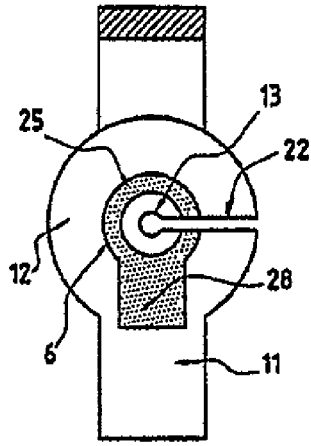

FIG.5

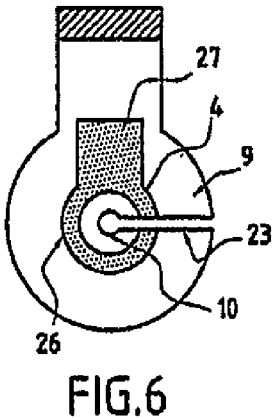

FIG.6

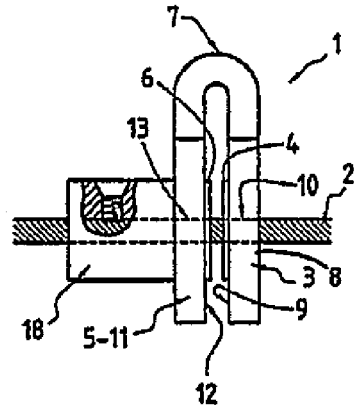

FIG.7

Column 4, line 27, "$l_{20}$, and $l_{21}$" should read -- $\ell_{20}$ and $\ell_{21}$ --.

Signed and Sealed this

Nineteenth Day of June, 2007

JON W. DUDAS
*Director of the United States Patent and Trademark Office*

United States Patent
Gautier et al.

(10) Patent No.: US 6,957,793 B2
(45) Date of Patent: Oct. 25, 2005

(54) CONTACT SUPPORT FOR A CYCLE SAFETY DEVICE

(76) Inventors: Gérard Gautier, 19 Villa de la Réunion, Paris (FR); Yves Michel Jeulin, 8 rue du Dessous des Berges, Paris (FR); Emmanuel Broquin Lacombe, 28 rue Edmond Nocard, Saint Maurice (FR)

(*) Notice: Subject to any disclaimer, the term of this patent is extended or adjusted under 35 U.S.C. 154(b) by 0 days.

(21) Appl. No.: 09/979,362
(22) PCT Filed: Mar. 22, 2001
(86) PCT No.: PCT/FR01/00864
   § 371 (c)(1),
   (2), (4) Date: Apr. 30, 2002
(87) PCT Pub. No.: WO01/70561
   PCT Pub. Date: Sep. 27, 2001

(65) Prior Publication Data
US 2002/0134893 A1 Sep. 26, 2002

(30) Foreign Application Priority Data
Mar. 23, 2000 (FR) .................. 00 03701

(51) Int. Cl.$^7$ .................................. F16L 3/00
(52) U.S. Cl. ........................... 248/49; 340/479
(58) Field of Search ..................... 248/49; 340/432, 340/473, 541, 479; 200/61.12, 61.87; 188/65.2, 65.1, 67

(56) References Cited

U.S. PATENT DOCUMENTS

| | | | | |
|---|---|---|---|---|
| 3,900,084 A | * | 8/1975 | Parr | 188/196 F |
| 4,586,021 A | * | 4/1986 | Nickols | 340/134 |
| 4,896,138 A | | 1/1990 | Nickols | 340/479 |
| 5,803,207 A | * | 9/1998 | Nielsen | 188/24.12 |
| 6,454,055 B1 | * | 9/2002 | Coons et al. | 188/24.22 |

* cited by examiner

*Primary Examiner*—Gwendolyn Baxter
(74) *Attorney, Agent, or Firm*—Weingarten, Schurgin, Gagnebin & Lebovici LLP

(57) ABSTRACT

A contact support suitable for mounting on a cycle brake control cable, the support comprising: a first portion which is fixed relative to the cycle frame, said fixed portion having a first contact surface; a second portion which is movable relative to the cycle frame, and suitable for being secured to the cable, said moving portion presenting a second contact surface; the support comprising connection means between the fixed portion and the moving portion, said connection means being suitable for being deformed elastically between: an extreme relaxed state for the support in which the contact surfaces are spaced apart from each other; and a tensioned state for the support in which the contact surfaces press against each other, the connection means then being elastically deformed.

7 Claims, 2 Drawing Sheets

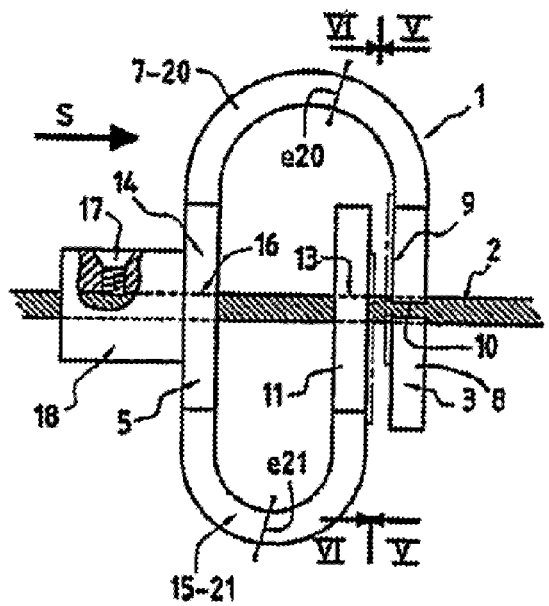

UNITED STATES PATENT AND TRADEMARK OFFICE
CERTIFICATE OF CORRECTION

PATENT NO. : 6,957,793 B2
APPLICATION NO. : 09/979362
DATED : October 25, 2006
INVENTOR(S) : Gérard Gautier et al.

It is certified that error appears in the above-identified patent and that said Letters Patent is hereby corrected as shown below:

Title page, please replace the Title Page with the following new Title Page, which is attatched.

Second page of drawings, Sheet 1 of 2, please replace the figures with the following new figures:

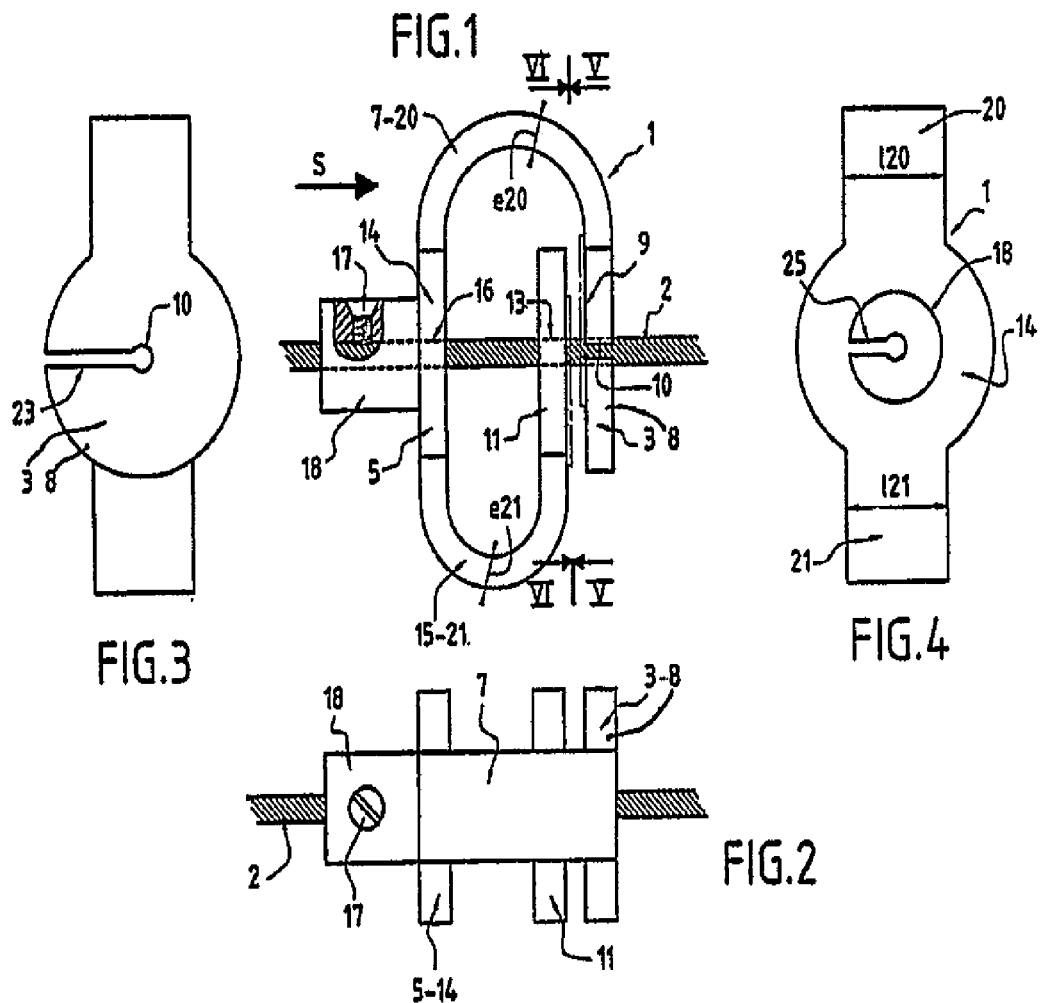

UNITED STATES PATENT AND TRADEMARK OFFICE
CERTIFICATE OF CORRECTION

| | |
|---|---|
| PATENT NO. | : 6,957,793 B2 |
| APPLICATION NO. | : 09/979362 |
| DATED | : October 25, 2006 |
| INVENTOR(S) | : Gérard Gautier et al. |

It is certified that error appears in the above-identified patent and that said Letters Patent is hereby corrected as shown below:

Third page of drawings, Sheet 2 of 2, please replace the figures with the following new figures:

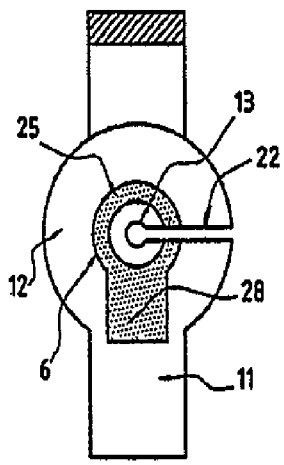

FIG.5

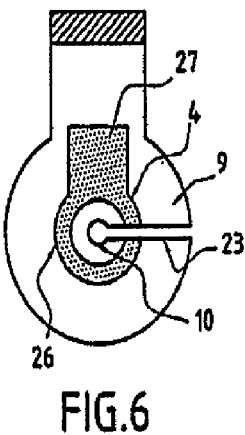

FIG.6

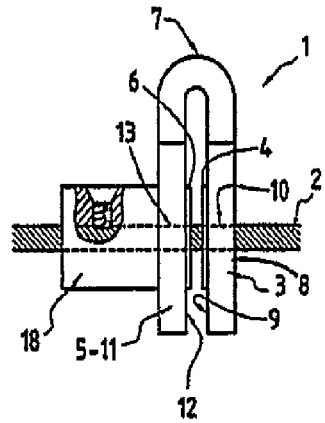

FIG.7

Column 4, line 27, "$l_{20}$, and $l_{21}$" should read -- $\ell_{20}$ and $\ell_{21}$ --.

Signed and Sealed this

Seventeenth Day of July, 2007

JON W. DUDAS
*Director of the United States Patent and Trademark Office*

(12) United States Patent
Gautier et al.

(10) Patent No.: US 6,957,793 B2
(45) Date of Patent: Oct. 25, 2005

(54) CONTACT SUPPORT FOR A CYCLE SAFETY DEVICE

(76) Inventors: Gérard Gautier, 19 Villa de la Réunion, Paris (FR); Yves Michel Jeulin, 8 rue du Dessous des Berges, Paris (FR); Emmanuel Broquin Lacombe, 28 rue Edmond Nocard, Saint Maurice (FR)

(*) Notice: Subject to any disclaimer, the term of this patent is extended or adjusted under 35 U.S.C. 154(b) by 0 days.

(21) Appl. No.: 09/979,362
(22) PCT Filed: Mar. 22, 2001
(86) PCT No.: PCT/FR01/00864
§ 371 (c)(1),
(2), (4) Date: Apr. 30, 2002
(87) PCT Pub. No.: WO01/70561
PCT Pub. Date: Sep. 27, 2001

(65) Prior Publication Data
US 2002/0134893 A1 Sep. 26, 2002

(30) Foreign Application Priority Data
Mar. 23, 2000 (FR) .......................... 00 03701

(51) Int. Cl.$^7$ .......................... F16L 3/00
(52) U.S. Cl. .......................... 248/49; 340/479
(58) Field of Search .......................... 248/49; 340/432, 340/473, 541, 479; 200/61.12, 61.87; 188/65.2, 65.1, 67

(56) References Cited

U.S. PATENT DOCUMENTS

| | | | |
|---|---|---|---|
| 3,900,084 A | * 8/1975 | Farr | 188/196 F |
| 4,586,021 A | * 4/1986 | Nickols | 340/134 |
| 4,896,138 A | 1/1990 | Nickols | 340/479 |
| 5,803,207 A | * 9/1998 | Nielsen | 188/24.12 |
| 6,454,055 B1 | * 9/2002 | Cmos et al. | 188/24.22 |

* cited by examiner

Primary Examiner—Gwendolyn Baxter
(74) Attorney, Agent, or Firm—Weingarten, Schurgin, Gagnebin & Lebovici LLP

(57) ABSTRACT

A contact support suitable for mounting on a cycle brake control cable, the support comprising: a first portion which is fixed relative to the cycle frame, said fixed portion having a first contact surface; a second portion which is movable relative to the cycle frame, and suitable for being secured to the cable, said moving portion presenting a second contact surface; the support comprising connection means between the fixed portion and the moving portion, said connection means being suitable for being deformed elastically between: an extreme relaxed state for the support in which the contact surfaces are spaced apart from each other; and a tensioned state for the support in which the contact surfaces press against each other, the connection means then being elastically deformed.

7 Claims, 2 Drawing Sheets

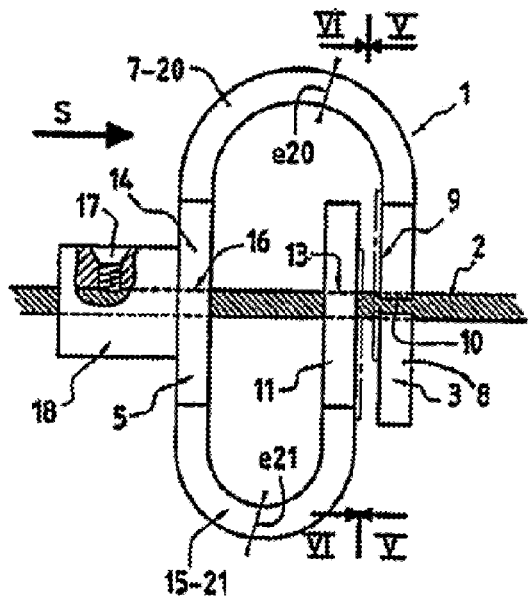

UNITED STATES PATENT AND TRADEMARK OFFICE
CERTIFICATE OF CORRECTION

| | | |
|---|---|---|
| PATENT NO. | : 6,957,793 B2 | Page 1 of 3 |
| APPLICATION NO. | : 09/979362 | |
| DATED | : October 25, 2005 | |
| INVENTOR(S) | : Gérard Gautier et al. | |

It is certified that error appears in the above-identified patent and that said Letters Patent is hereby corrected as shown below:

Title page, please replace the Title Page with the following new Title Page, which is attached.

Second page of drawings, Sheet 1 of 2, please replace the figures with the following new figures:

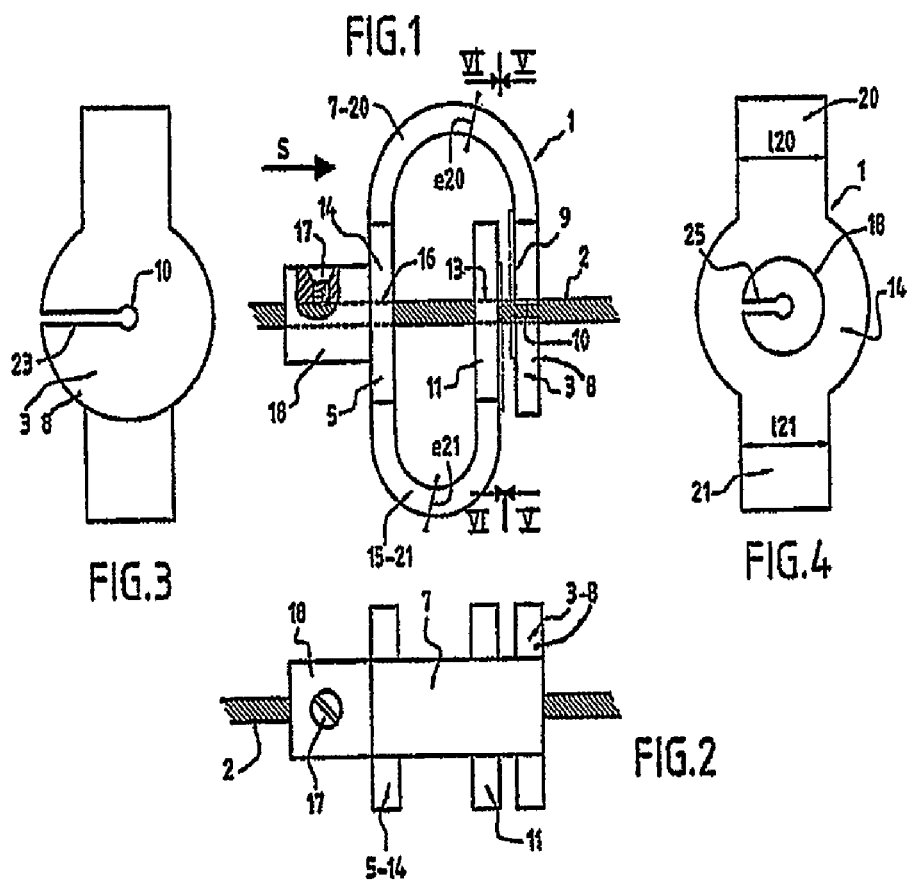

UNITED STATES PATENT AND TRADEMARK OFFICE
CERTIFICATE OF CORRECTION

PATENT NO.       : 6,957,793 B2                                          Page 2 of 3
APPLICATION NO. : 09/979362
DATED            : October 25, 2005
INVENTOR(S)      : Gérard Gautier et al.

It is certified that error appears in the above-identified patent and that said Letters Patent is hereby corrected as shown below:

Third page of drawings, Sheet 2 of 2, please replace the figures with the following new figures:

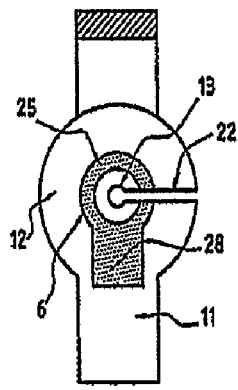
FIG.5

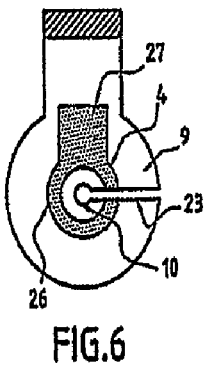
FIG.6

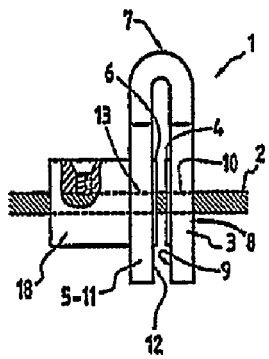
FIG.7

Column 4, line 27, "$l_{20}$, and $l_{21}$" should read -- $\ell_{20}$ and $\ell_{21}$ --.

This certificate supersedes Certificates of Correction issued June 19, 2007 and July 17, 2007.

Signed and Sealed this

Seventh Day of August, 2007

JON W. DUDAS
*Director of the United States Patent and Trademark Office*

United States Patent
Gautier et al.

(10) Patent No.: US 6,957,793 B2
(45) Date of Patent: Oct. 25, 2005

(54) CONTACT SUPPORT FOR A CYCLE SAFETY DEVICE

(76) Inventors: Gérard Gautier, 19 Villa de la Réunion, Paris (FR); Yves Michel Jeulla, 8 rue du Dessous des Berges, Paris (FR); Emmanuel Broquin Lacombe, 28 rue Edmond Nocard, Saint Maurice (FR)

(*) Notice: Subject to any disclaimer, the term of this patent is extended or adjusted under 35 U.S.C. 154(b) by 0 days.

(21) Appl. No.: 09/979,362
(22) PCT Filed: Mar. 22, 2001
(86) PCT No.: PCT/FR01/00864
§ 371 (c)(1), (2), (4) Date: Apr. 30, 2002
(87) PCT Pub. No.: WO01/70561
PCT Pub. Date: Sep. 27, 2001

(65) Prior Publication Data
US 2002/0134893 A1 Sep. 26, 2002

(30) Foreign Application Priority Data
Mar. 23, 2000 (FR) .................................. 00 03701

(51) Int. Cl.⁷ .............................. F16L 3/00
(52) U.S. Cl. ............................ 248/49; 340/479
(58) Field of Search ................... 248/49; 340/432, 340/473, 541, 479; 200/61.12, 61.87; 188/65.2, 65.1, 67

(56) References Cited

U.S. PATENT DOCUMENTS

| 3,900,084 A | * | 8/1975 | Farr ............... 168/196 F |
| 4,506,021 A | * | 4/1985 | Nickols ............ 340/134 |
| 4,895,133 A | | 1/1990 | Nickols ............ 340/479 |
| 5,803,207 A | * | 9/1998 | Nickson ........... 188/24.12 |
| 6,454,055 B1 | * | 9/2002 | Coons et al. ...... 188/24.22 |

* cited by examiner

Primary Examiner—Gwendolyn Baxter
(74) Attorney, Agent, or Firm—Weingarten, Schurgin, Gagnebin & Lebovici LLP

(57) ABSTRACT

A contact support suitable for mounting on a cycle brake control cable, the support comprising: a first portion which is fixed relative to the cycle frame, said fixed portion having a first contact surface; a second portion which is movable relative to the cycle frame, and suitable for being secured to the cable, said moving portion presenting a second contact surface; the support comprising connection means between the fixed portion and the moving portion, said connection means being suitable for being deformed elastically between an extreme relaxed state for the support in which the contact surfaces are spaced apart from each other; and a tensioned state for the support in which the contact surfaces press against each other, the connection means then being elastically deformed.

7 Claims, 2 Drawing Sheets